United States Patent
Berge

(10) Patent No.: US 9,441,124 B2
(45) Date of Patent: *Sep. 13, 2016

(54) AQUEOUS INK-JET INKS CONTAINING ALTERNATING POLYURETHANES AS BINDERS

(75) Inventor: Charles T Berge, Earleville, MD (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 388 days.

This patent is subject to a terminal disclaimer.

(21) Appl. No.: 13/990,470

(22) PCT Filed: Dec. 20, 2011

(86) PCT No.: PCT/US2011/066184
§ 371 (c)(1),
(2), (4) Date: May 30, 2013

(87) PCT Pub. No.: WO2012/088127
PCT Pub. Date: Jun. 28, 2012

(65) Prior Publication Data
US 2013/0267656 A1     Oct. 10, 2013

Related U.S. Application Data

(60) Provisional application No. 61/424,964, filed on Dec. 20, 2010.

(51) Int. Cl.
| | | |
|---|---|---|
| C08G 18/08 | (2006.01) | |
| C08G 18/10 | (2006.01) | |
| C08G 18/12 | (2006.01) | |
| C08G 18/34 | (2006.01) | |
| C09D 11/30 | (2014.01) | |
| C09D 11/322 | (2014.01) | |
| C09D 11/324 | (2014.01) | |
| C09D 11/326 | (2014.01) | |

(52) U.S. Cl.
CPC ........... *C09D 11/30* (2013.01); *C08G 18/0823* (2013.01); *C08G 18/10* (2013.01); *C08G 18/12* (2013.01); *C08G 18/34* (2013.01); *C09D 11/322* (2013.01); *C09D 11/324* (2013.01); *C09D 11/326* (2013.01)

(58) Field of Classification Search
CPC .. C08G 18/0823; C08G 18/10; C08G 18/12; C08G 18/34; C09D 11/30; C09D 11/322; C09D 11/324; C09D 11/326
See application file for complete search history.

(56) References Cited

U.S. PATENT DOCUMENTS

| | | |
|---|---|---|
| 3,479,310 A | 11/1969 | Bayer |
| 4,108,814 A | 8/1978 | Reiff et al. |
| 4,408,008 A | 10/1983 | Markusch |
| 5,085,698 A | 2/1992 | Ma et al. |
| 5,128,434 A | 7/1992 | Lai |
| 2008/0103251 A1* | 5/2008 | O'Donnell ............... C08L 75/04 524/590 |
| 2012/0035317 A1* | 2/2012 | Roberts ............... C08G 18/0823 524/591 |

FOREIGN PATENT DOCUMENTS

| | | |
|---|---|---|
| WO | 2006/027544 A1 | 3/2006 |
| WO | 2009/076386 A1 | 6/2009 |
| WO | 2009/143417 A1 | 11/2009 |

OTHER PUBLICATIONS

International Search Report for International Application No. PCT/US2011/066184 dated Apr. 24, 2012, issued by the EPO in Rijswijk, Netherlands.

* cited by examiner

*Primary Examiner* — Patrick Niland
(74) *Attorney, Agent, or Firm* — Simon L. Xu

(57) ABSTRACT

The present disclosure provides novel aqueous ink-jet inks containing an aqueous vehicle, a pigment and an alternating polyurethane as a binder.

11 Claims, No Drawings

AQUEOUS INK-JET INKS CONTAINING ALTERNATING POLYURETHANES AS BINDERS

CROSS REFERENCE TO RELATED APPLICATIONS

This application claims priority under 35 U.S.C. §119 from U.S. Provisional Application Ser. No. 61/424,964, filed Dec. 20, 2010.

BACKGROUND OF THE INVENTION

This disclosure relates to novel aqueous ink-jet inks containing an aqueous vehicle, a pigment and an alternating polyurethane as a binder.

Polyurethanes are typically products of the reaction of a polyisocyanate and a polyol. Hard segments are typically made by inclusion of a short chain diol or diamine which when reacted with isocyanates produces urea or carbamate groups within a short distance from each other. The close proximity of urea or carbamate groups is important when intermolecular H-bonding is desired. The intermolecular H-bonding results in the formation of semi-crystalline regions within the polymer matrix. The semi-crystalline regions can be viewed as intermolecular crosslinks that give polyurethanes and polyureas their toughness and elasticity. U.S. Pat. No. 5,128,434 discloses the control of hard segment size in polyurethane formation by reacting two mole equivalents of a diisocyanate with about one mole equivalent of a low molecular weight diol.

Many aqueous dispersing agents as well as binders that are used in ink jet inks are made by the copolymerization of a diisocyanate, a soft segment diol and a diol containing an ionizing group. This is known to those skilled in the art as an "A+B+B$^1$" copolymer, where "A" represents the diisocyanate, "B" represents one of the diols and "B$^1$" the second diol. The resulting copolymer is considered "random" since the isocyanate groups can react with the hydroxyl groups from either "B" or "B$^1$" in a random fashion. Under these random polymerization conditions, the distribution of "B" or "B$^1$" in the total polymer distribution will produce individual polymers that are made up of just A+B and A+B$^1$. Skewing of the polymer composition within the polymer distribution is well knows in the addition and condensation polymers literature and finds firm fundamental understanding in science.

Compounding the problem with random copolymerization is that a hard segment typically contains a hydrophilic ionic group. Since the ionic group resides in the hard segment, separation of the acid content (acid-number) from the hard segment and changing the amount and location of acid content are not possible.

A need exists for highly stable and higher-quality inks for ink-jet applications. Although improvements in polyurethane dispersants and binders have significantly contributed to improved ink-jet inks, the current dispersants and binders still do not provide inks with the requisite stability, print nozzle health and lifetime needed for ink-jet applications. The properties of the printed ink such as durability, fastness and optical density (OD) still require improvements. The present invention satisfies this need by providing ink compositions having a binder which is a true alternating polyurethane where the content and location of the hard segment as well as the content and location of the hydrophilic ionic segment can be controlled, independent of one another.

SUMMARY OF THE INVENTION

The inventor found that by incorporating a hard segment in one monomer and a hydrophilic segment in a second monomer, a true alternating polyurethane can be produced with the necessary functionality in the alternating segments. In doing so, these polyurethanes always contain ionic and hard segment in the same polymer. Skewing of either component is thus eliminated. Replacing the soft segment diol with an acid containing soft segment diol puts the hydrophilic ionic group in the more hydrophobic soft segment. The second monomer is an isocyanate terminated monomer that can contain groups that make up a hard segment or other functionalities. Conversely, the diol monomer can contain the hard segment and the diisocyanate monomer can contain the hydrophilic ionic groups. In either case, the resulting polyurethane is alternating in nature. Increasing the hardness of a polyurethane, decreasing the acid content of a polyurethane, or a combination of both, can results in a significant improvement in the durability, printability, jetting performance, etc. of the ink when used in an inkjet ink.

An embodiment of the invention provides an aqueous ink-jet ink comprising a pigment, an aqueous vehicle and an alternating polyurethane binder comprising a first monomer with a formula of OCN—R$^1$—NCO and a second monomer with a formula of HO—R$^2$—OH, wherein the isocyanate groups in the first monomer react with the hydroxyl groups in the second monomer during polymerization to produce a polymer of the general structure of Formula I:

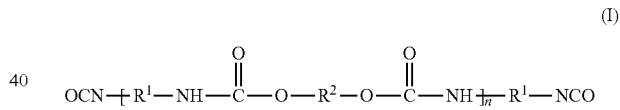

(I)

wherein the terminal isocyanate groups in said polymer is capped with a capping agent;

each R$^1$ is C$_1$-C$_{20}$ alkyl, C$_3$-C$_{20}$ substituted alkyl, C$_6$-C$_{40}$ aryl, C$_9$-C$_{40}$ substituted aryl, or a polymeric unit of the structure of Formula II:

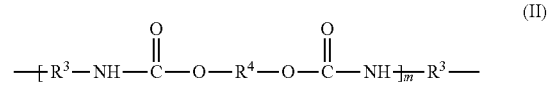

(II)

each R$^2$ is C$_1$-C$_{20}$ alkyl, C$_3$-C$_{20}$ substituted alkyl, C$_6$-C$_{40}$ aryl, C$_9$-C$_{40}$ substituted aryl, polyether, polyester, polycarbonate, polycarbonate-co-polyester, acrylic, or HO—R$^2$—OH is the reaction product of OCN—R$^1$—NCO or a di-anhydride with a diol HO—R$^5$—OH;

each R$^3$ is C$_1$-C$_{20}$ alkyl, C$_3$-C$_{20}$ substituted alkyl, C$_6$-C$_{40}$ aryl, C$_9$-C$_{40}$ substituted aryl;

each R$^4$ is C$_1$-C$_{20}$ alkyl or C$_3$-C$_{20}$ substituted alkyl;

R$^5$ is C$_1$-C$_{20}$ alkyl, C$_3$-C$_{20}$ substituted alkyl, C$_6$-C$_{40}$ aryl, C$_9$-C$_{40}$ substituted aryl, polyether, polyester or polycarbonate;

n is an integer from 1 to 200;

each m is an integer from 1 to 10;

said capping agent is one or more members selected from the group consisting of $R^6CHR^7OH$, $R^6CHR^7SH$, $R^7R^8NH$, and epoxide $CH_2OCR^7R^8$;

each $R^6$ is $C_1$-$C_{20}$ alkyl, $C_3$-$C_{20}$ substituted alkyl, $C_6$-$C_{40}$ aryl or $C_9$-$C_{40}$ substituted aryl;

each $R^7$ is H, $C_1$-$C_{20}$ alkyl, $C_3$-$C_{20}$ substituted alkyl, $C_6$-$C_{40}$ aryl or $C_9$-$C_{40}$ substituted aryl; and each $R^8$ is H, $C_1$-$C_{20}$ alkyl, $C_3$-$C_{20}$ substituted alkyl, $C_6$-$C_{40}$ aryl or $C_9$-$C_{40}$ substituted aryl, provided that when $R^7$ is H, $R^8$ is not H.

Another embodiment provides that $R^1$ is $C_3$-$C_{20}$ substituted alkyl.

Another embodiment provides that $R^2$ is $C_1$-$C_{20}$ alkyl, $C_3$-$C_{20}$ substituted alkyl, polyether, polyester or polycarbonate.

Another embodiment provides that $R^3$ is $C_3$-$C_{20}$ substituted alkyl.

Another embodiment provides that n is an integer from 1 to 40.

Another embodiment provides that the capping agent is $R^7R^8NH$.

Another embodiment provides that OCN—$R^1$—NCO is isophorone diisocyanate or m-tetramethylene xylylene diisocyanate, and said capping agent is bis(methoxyethyl) amine.

Another embodiment provides that $R^1$ is $C_9$-$C_{40}$ substituted aryl.

Another embodiment provides that OCN—$R^1$—NCO is 2,4-toluene diisocyanate, and said capping agent is bis (methoxyethyl)amine.

Another embodiment provides that $R^1$ is a polymeric unit of the structure of Formula II:

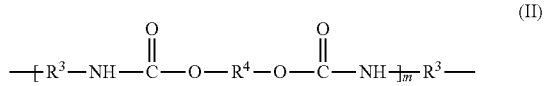

(II)

Another embodiment provides that HO—$R^2$—OH is the reaction product of a di-anhydride with a diol HO—$R^5$—OH.

Another embodiment provides that the di-anhydride is 3,3',4,4'-biphenyl-tetracarboxylic acid dianhydride, pyromellitic dianhydride or 4,4'-oxydiphthalic dianhydride.

Yet another embodiment provides that $R^5$ is polyether or polycarbonate, and m is an integer from 1 to 6.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "MW" means weight average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term 'NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "prepolymer" means the polymer that is an intermediate in a polymerization process, and can be considered a polymer.

As used herein, the term "AN" means acid number, mg KOH/gram of solid polymer.

As used herein, the term "OH number" means hydroxyl number, mg KOH/gram of solid polymer.

As used herein, the term "PUD" means the polyurethanes dispersions described herein.

As used herein, the term "BMEA" means bis(methoxyethyl)amine.

As used herein, the term "DBTDL" means dibutyltin dilaurate.

As used herein, the term "DEA" means diethanolamine.

As used herein, the term "DMPA" means dimethylol propionic acid.

As used herein, the term "HDI" means 1,6-hexamethylene diisocyanate.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein, the term "NMP" means n-Methyl pyrolidone.

As used herein, the term "2,4-TDI" means 2,4-toluene diisocyanate.

As used herein, the term "MDI" means 4,4'-diphenylmethane diisocyanate.

As used herein, the term "H$_{12}$MDI" means 4,4'-dicyclohexylmethane diisocyanate.

As used herein, the term "TODI" means 3,3'-dimethyl-4,4'-biphenyl diisocyanate.

As used herein, the term "C$_{12}$DI" means dodecane diisocyanate.

As used herein, the term "NDI" means 1,5-naphthalene diisocyanate.

As used herein, the term "IPDI" means isophorone diisocyanate.

As used herein, the term "TEB" means triethylene glycol monobutyl ether, a reagent supplied by Dow Chemical.

As used herein, the term "Sulfolane" means tetramethylene sulfone.

As used herein, the term "TRB-2" means Dainichiseika® TRB-2, a cyan pigment.

As used herein, Terathane® 650 is a polyether diol from Invista, Wichita, Kans.

As used herein, Eternacoll® UH-50 is a polycarbonate diol from UBE Industries, Tokyo, Japan.

As used herein, the term "aralkyl" denotes aryl substitution on an alkyl moiety. Examples of "aralkyl" include benzyl, diphenylmethyl, p-methylbenzyl and other aryl moieties bonded to straight-chain or branched alkyl groups.

As used herein, the term "PMDA" means Pyromellitic Dianhydride.

As used herein, the term "BPDA" means 4,4' Biphthalic Dianhydride.

As used herein, the term "OPDA" means 4,4' Oxidiphthalic Dianhydride.

As used herein, the term "TEDA" means Tetraethylene glycol diol.

As used herein, the term "Pripol" means Pripol 2033, a product supplied by Croda.

As used herein, the term "K-Kat XK-602" denotes a metal complex used in uretdione crosslinked powder coating and was supplied by King Industries, Inc, Norwalk, Conn.

As used herein, the term "substituted alkyl" denotes substitution of hydrogen atom(s) on an alkyl moiety by functional group(s) including ethers, esters, amines, thioether, mercaptans, hydroxy, halides, and acid groups, etc.

As used herein, the term "substituted aryl" denotes substitution of hydrogen atom(s) on an aryl moiety by functional group(s) including ethers, esters, amines, thioether, mercaptans, hydroxy, halides, and acid groups, etc.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Polyurethane Binder

Durable properties of polyurethanes have been associated with the balance of 'hard' and 'soft' segments. For polyurethanes formed by the reaction of a diisocyanate with a diol, the hard segment is defined as the segment in between and including two adjacent carbamate groups. A hard segment therefore has a carbamate group at each end. A soft segment in a polyurethane is formed from high molecular weight diols or polyols. A soft segment is mobile and normally present in a coiled formation. The urethane groups on one polymer chain form hydrogen bonding with the same or similar groups on neighboring polymer chains, resulting in a polyurethane network.

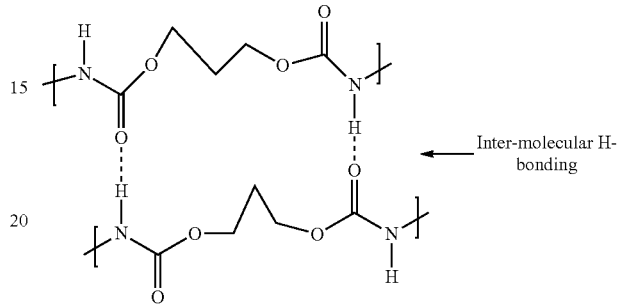

Inter-molecular H-bonding

A hard segment is covalently coupled to a soft segment in a polyurethane. The balance of hard and soft segments provides a polyurethane with the desired level of elasticity and toughness necessary for individual end use. Typically, ionizable groups are incorporated into the hard segment to make the resulting polyurethane water dispersible. However, these ionizable groups can interfere with the inter-molecular hydrogen bonding between the urethane groups on neighboring polymer chains. Consequently, to strengthen the hydrogen bonding between the urethane groups on different polymer chains, one needs to separate the ionizable groups from the hard segment. This can then lead to tougher and more elastic polyurethane films. Separation of ionizable groups from hard segment can also lead to better control of the acid content.

To prepare a polyurethane with ionizable groups separated from its hard segment, two monomers are required. In the present invention, a first monomer with a formula of OCN—R$^1$—NCO and a second monomer with a formula of HO—R$^2$—OH are employed to form an alternating polyurethane. The isocyanate groups in the first monomer react with the hydroxyl groups in the second monomer during polymerization to produce a polymer of the general structure of Formula I:

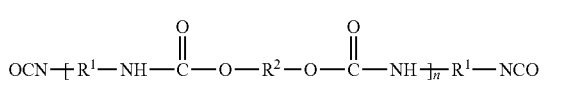

The terminal isocyanate groups on the polymer are subsequent capped with a capping agent. Each R$^1$ is C$_1$-C$_{20}$ alkyl, C$_3$-C$_{20}$ substituted alkyl, C$_6$-C$_{40}$ aryl, C$_9$-C$_{40}$ substituted aryl, or a polymeric unit of the structure of Formula II:

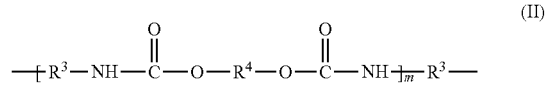

Each $R^2$ is $C_1$-$C_{20}$ alkyl, $C_3$-$C_{20}$ substituted alkyl, $C_6$-$C_{40}$ aryl, $C_9$-$C_{40}$ substituted aryl, polyether, polyester, polycarbonate, polycarbonate-co-polyester, acrylic, or HO—$R^2$—OH is the reaction product of OCN—$R^1$—NCO or a di-anhydride with a diol HO—$R^5$—OH. Each $R^3$, $R^4$, $R^5$, and m are as set forth above in the Summary of the Invention.

Diisocyanate OCN—$R^1$—NCO

Diisocyanate OCN—$R^1$—NCO where $R^1$ is $C_1$-$C_{20}$ alkyl, $C_3$-$C_{20}$ substituted alkyl, $C_6$-$C_{40}$ aryl, $C_9$-$C_{40}$ substituted aryl is either available from commercial sources or can be readily prepared by methods familiar to one of ordinary skill in the art. Examples of suitable diisocyanates include, but are not limited to, 2,4-toluene diisocyanate (2,4-TDI); 2,6-toluene diisocyanate (2,6-TDI); trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODI); Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; and isophorone diisocyanate (IPDI).

Diisocyanate OCN—$R^1$—NCO where $R^1$ is a polymeric unit of the structure of Formula II can be prepared by the reaction of a diol HO—$R^2$—OH with a diisocyanate OCN—$R^3$—NCO.

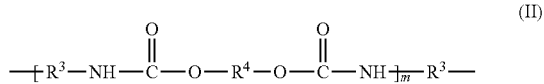

(II)

Diol HO—$R^2$—OH

Diol HO—$R^2$—OH where $R^2$ is $C_1$-$C_{20}$ alkyl, $C_3$-$C_{20}$ substituted alkyl, $C_6$-$C_{40}$ aryl, $C_9$-$C_{40}$ substituted aryl and polyether is either available from commercial sources or can be readily prepared by methods familiar to one of ordinary skill in the art.

Diol HO—$R^2$—OH where $R^2$ is polyester includes reaction products of dihydric alcohols and polybasic (typically dibasic) carboxylic acids. Instead of these polycarboxylic acids, the corresponding carboxylic acid anhydrides, or polycarboxylic acid esters of lower alcohols, or mixtures thereof may be used for preparing the polyesters.

The polycarboxylic acids may be aliphatic, cycloaliphatic, aromatic or heterocyclic or mixtures thereof and they may be substituted, for example, by halogen atoms, or unsaturated. The following are mentioned as examples: succinic acid, adipic acid, suberic acid, azelaic acid, sebacic acid, 1,12-dodecyldioic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate.

Diol HO—$R^2$—OH where $R^2$ is polycarbonate, polycarbonate-co-polyester and acrylic includes those known, such as the products obtained from the reaction of diols such as propanediol-(1,3), butanediol-(1,4) or hexanediol-(1,6), diethylene glycol, triethylene glycol or tetraethylene glycol, and higher polyether diols with phosgene, diarylcarbonates such as diphenylcarbonate, dialkylcarbonates such as diethylcarbonate, or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. For further examples of making these diols, see: U.S. Pat. Nos. 6,248,839 and 5,990,245.

Diol HO—$R^2$—OH where $R^2$ is the reaction product of a di-anhydride with a diol HO—$R^5$—OH can be readily prepared by one of ordinary skill in the art using a di-anhydride and a diol HO—$R^5$—OH that is either commercially available or can be easily prepared as described above for HO—$R^2$—OH where $R^2$ is $C_1$-$C_{20}$ alkyl, $C_3$-$C_{20}$ substituted alkyl, $C_6$-$C_{40}$ aryl, $C_9$-$C_{40}$ substituted aryl, polyether, polyester or polycarbonate.

Example of suitable di-anhydrides include, but are not limited to, 3,3',4,4'-biphenyl-tetracarboxylic acid dianhydride, pyromellitic dianhydride or 4,4'-oxydiphthalic dianhydride.

Diol Substituted with an Ionic Group

Diol HO—$R^2$—OH may contain an aqueous dispersing moiety that is ionic or ionizable. Examples of ionic dispersing groups include carboxylate groups (—COOM), phosphate groups (—$OPO_3M_2$), phosphonate groups (—$PO_3M_2$), sulfonate groups (—$SO_3M$), and quaternary ammonium groups (—$NR_3Q$), wherein M is a cation such as a monovalent metal ion (e.g., $Na^+$, $K^+$, $Li^+$, etc.), $H^+$ or $NR_4^+$; Q is a monovalent anion such as chloride or hydroxide; and each R can independently be an alkyl, aralkyl, aryl or hydrogen.

The ionizable groups in general correspond to the ionic groups, except that they are in the acid (such as carboxyl —COOH) or base (such as primary, secondary or tertiary amine —$NH_2$, —NRH, or —$NR_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula $(HO)_pQ(COOH)_q$, wherein Q is $C_1$-$C_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula III below:

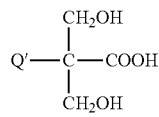

wherein Q' is hydrogen or $C_1$-$C_8$ alkyl. Additional α,α-dimethylol alkanoic acids are represented by the structural formula $R^5C$—$(CH_2OH)_2$—COOH, wherein $R^5$ is hydrogen or $C_1$-$C_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include $H_2N$—$(CH_2)_4$—$CH(CO_2H)$—$NH_2$, and $H_2N$—$CH_2$—$CH_2$—NH—$CH_2$—$CH_2$—$CO_2Na$.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula $H_2N$—$CH_2$—$CH_2$—NH—$(CH_2)_r$—$SO_3Na$, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium.

When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface.

Ratios of Polyurethane Components

For the polyurethane described above, the ratio of diisocyanate to diol is typically greater than 1:1, and more typically from about 1.05:1 to about 1.5:1. This ratio is critical in ensuring that the prepolymer formed has an isocyanate group at each end. A capping agent, selected from the group consisting of $R^6CHR^7OH$, $R^6CHR^7SH$, $R^7R^8NH$, and epoxide $CH_2OCR^7R^8$ is used to convert the prepolymer to the final polyurethane product.

The amount of the capping agent employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, typically from about 1.0:1.1 to about 1.1:1, and more typically from about 1.0:1.05 to about 1.1:1, on an equivalent basis.

Alcohols $R^6CHR^7OH$, primary or secondary monoamines $R^7R^8NH$ are commonly used as the capping agents. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl) amine, diethylamine, bis(methoxyethyl)amine, N-methyl-stearyl amine, diethanolamine and N-methyl aniline.

Pigments

A wide variety of organic and inorganic pigments, alone or in combination, may be used together with the polyurethane binder discussed above to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

The polyurethane polymer dispersant is typically present in the range of from 0.1% to 20%, and more specifically from 0.2% to about 10%, by weight based on the weight of the total ink composition.

Proportion of Main Ingredients

The pigment levels employed in the instant inks are those levels which are typically needed to impart the desired color density to the printed image. Typically, pigment levels are in the range of about 0.05 to about 10%, by weight based on the total weight of the ink. The inventive polyurethane binder is added as a distinct additive to an ink at the time when the ink is formulated. The amount of the polyurethane binder is dictated by the degree of fixation sought and the range of ink properties which may be tolerated. Typically, the level of polyurethane binder is about 10%, more typically from about 0.1 to about 8%, and most typically from about 0.2 to about 6%, by weight based on the total weight of ink.

The polyurethane binder provides some degree of improved ink fixation onto the substrate. Better fixation is obtained at higher levels. However, generally at some point, viscosity is increased excessively and jetting performance becomes unacceptable. The right balance of properties must be determined for each circumstance, which determination may generally be made by one of ordinary skill in the art.

Preparation of the Pigment Dispersion

The pigmented dispersions used in this invention can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present invention, a lab-scale Eiger Minimill (Model M250, VSE EXP) manufactured by Eiger Machinery Inc., Chicago, Ill. is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Vehicle

The pigmented ink of this disclosure comprises an ink vehicle typically an aqueous ink vehicle, also known as aqueous vehicle or aqueous carrier medium, the aqueous dispersion and optionally other ingredients.

The ink vehicle is the liquid carrier (or medium) for the aqueous dispersion(s) and optional additives. The term "aqueous vehicle" refers to a vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Additives

Other ingredients, additives, may be formulated into the inkjet ink, to the extent that such other ingredients do not interfere with the stability and jetability of the inkjet ink. This may be readily determined by routine experimentation by one skilled in the art.

Surfactants are commonly added to inks to adjust surface tension and wetting properties. Suitable surfactants include the ones disclosed in the "Vehicle" section above. Surfactants are typically used in amounts up to about 5% and more typically in amounts up to 2%, by weight based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The following examples illustrate the invention without, however, being limited thereto.

EXAMPLES

Extent of Polyurethane Reaction

The extent of polyurethane reaction was determined by a titration with dibutylamine to detect the isocyanate content (NCO %), a common method used in urethane chemistry.

In this method, a sample of the isocyanate containing prepolymer is reacted with a known amount of dibutylamine solution, and the residual amine is back titrated with aqueous HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as D50 and D95.

Solid Content Measurement

Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 minutes.

Step 1: Preparation of Acid-Diol Adducts
UH-50-PMDA Adduct AD-1

This intermediate was prepared by loading into a dry 2 L reactor charged with UH-50 polycarbonate diol (318.74 g, 0.650 moles), BPDA dianhydride (69.60 g, 0.319 moles) and sulfolane solvent (258.8 g). The reactor was heated to 90~95° C. with stirring. The progress of the reaction was followed by a titration for acid content until the acid number reached 57.50 mg KOH/g to give the titled adduct AD-1.

Following a procedure similar to the preparation of the UH-50-PMDA adduct, 4 more adducts, AD-2 through AD-5 were prepared using the acids and diols listed in Table 1 below. The reaction time at 90~95° C. varied from 2 to 9 hours depending on the compositions. The solid content and AN for each adduct are also listed in Table 1.

TABLE 1

| Adduct No. | Acid | Amount of Acid (g) | Diol | Amount of Diol (g) | Solvent (Sulfolane, g) | Solids Content (%) | AN |
| --- | --- | --- | --- | --- | --- | --- | --- |
| AD-1 | PMDA | 69.6 | UH-50 | 318.74 | 258.80 | 60.0 | 57.50 |
| AD-2 | PMDA | 256.65 | T650 | 1568.74 | 737.5 | 71.2 | 55.65 |
| AD-3 | OPDA | 43.5 | Pripol 2033 | 163.86 | 100.0 | 67.5 | 51.2 |
| AD-4 | PMDA | 87 | Tetraethylene Glycol | 158.9 | 100.0 | 71.1 | 129.5 |
| AD-5 | BPDA | 210.6 | UH-50 | 719.25 | 621.05 | 60.0 | 51.8 |

Step 2: Preparation of Hard Segment-Diisocyanate Adducts
TMXDI-3G Adduct HS-1

To a dry 1 L reactor were loaded a diol 3G (76.28 g, 1.00 mole) 3G and sulfolane solvent (62.74 g). After thorough mixing at ambient temperature, TMXDI (488.61 g, 2.00 moles) was added quickly. The reaction was allowed to exotherm and then heated to 80° C. The content of NCO was followed by titration. The reaction was terminated when the content of the content reached 3.18 mmol NCO per gram solution.
TMXDI-3G Adduct HS-2

To a dry 2 L reactor were loaded a diol 3G (152.29 g, 2.00 moles) 3G and sulfolane solvent (152.39 g). After thorough mixing at ambient temperature, TMXDI (977.13 g, 4.00 moles) was added quickly. The reaction was allowed to exotherm and then heated to 80° C. The content of NCO was followed by titration. The reaction was terminated when the content of the content reached 3.11 mmol NCO per gram solution.
TDI-3G Adduct HS-3

To a dry 500 mL reactor were loaded a diol 3G (62.79 g, 0.825 mole) 3G and sulfolane solvent (150.10 g). The reaction mass was cooled to below 15° C. during thorough mixing. To the mixture was quickly added 2,4-TDI (287.29 g, 1.650 moles) while maintaining the temperature below 15° C. The content of NCO was followed by titration. The reaction was terminated when the content of the content reached 13.7 mmol NCO per gram solution.
Step 3: Preparation of Hard Segment-Diol Adducts
TDI-3G-Pripol Adduct HSD-1

To a dry 1 L reactor equipped with agitator and under nitrogen atmosphere was added hard segment-diisocyanate adduct HS-3 (55.58 g, 0.76 moles), prepared above in Step 2. To the reactor was added sulfolane solvent (104.28 g), and the resulting mixture was thoroughly mixed. To the mixture was added diol Pripol 2033 (444.46 g, 0.78 moles) was added and the reaction mixture was heated to 80° C. and maintained at 80° C. until the content of NCO was less than 0.05%. The OH number of the product was determined to be 74 mg KOH/gram solution.
Step 4: Preparation of Alternating Polyurethanes The following examples demonstrate the combination of a diisocyanate and a diol, in a predetermined molar ratio, to produce alternating copolymer polyurethane. The following examples demonstrate how critical functional groups can be placed in either segments in an alternating copolymer.
Polyurethane PU-1 with Alternating Acid Segment and Hard Segment To a dry 1 L reactor equipped with an agitator under nitrogen atmosphere was charged hard segment diisocyanate HS-1 (41.23 g). To the reactor was added acid diol AD-1 (107.12 g) and the resulting mixture was thoroughly mixed. To the mixture was added DBTDL (0.1 g), and the reactor was heated to 60 C.° and held at that temperature until the content of NCO, as measured by titration, was 0.42%. To the reactor was added a capping reagent BMEA (1.78 g) to terminate the NCO end groups providing a neutral polyurethane solution. To produce an aqueous solution 7.82 g of a 45 wt % aqueous solution of KOH was added to the stirring reaction mass followed by 196.79 g D.I. water. The aqueous urethane solution was held at 50° C. for 2 hours and then cooled to ambient temperature to provide PU-1 with a solid content of 27.9%, AN of 59.8, and Mn of 11157.

Using a procedure similar to the one described above for PU-1, three more polyurethanes PU-2, PU-3 and PU-4 were synthesized using ingredients listed in Table 2 below. The properties of PU-1 through PU-4 are also listed in Table 2.

TABLE 2

| Polyurethane | Acid-Diol | Amount of Acid Diol (g) | Hard Segment Diisocyanate | Amount of Hard Segment (g) | BMEA Capping Agent (g) | Aqueous KOH (45%, g) | Water (g) | Final Solids (%) | AN | Mn |
| --- | --- | --- | --- | --- | --- | --- | --- | --- | --- | --- |
| PU-1 | AD-1 | 107.12 | HS-1 | 41.23 | 1.78 | 7.82 | 196.79 | 27.9 | 59.8 | 11157 |
| PU-2 | AD-2 | 96.74 | HS-1 | 51.83 | 2.71 | 27.11 | 238.09 | 31.0 | 63.8 | 10386 |

TABLE 2-continued

| Polyurethane | Acid-Diol | Amount of Acid Diol (g) | Hard Segment Diisocyanate | Amount of Hard Segment (g) | BMEA Capping Agent (g) | Aqueous KOH (45%, g) | Water (g) | Final Solids (%) | AN | Mn |
|---|---|---|---|---|---|---|---|---|---|---|
| PU-3 | AD-2 | 36.60 | HS-2 | 111.92 | 1.74 | 18.71 | 197.85 | 37.3 | 50.7 | 11218 |
| PU-4 | AD-3 | 96.74 | HS-1 | 51.84 | 1.83 | 20.22 | 238.92 | 30.0 | 59.7 | 11637 |

Preparation of Multi-Stage Alternating Polyurethanes

Polyurethanes can be synthesized as alternating condensation polymers in a way that utilizes the difference in reactivity of the two isocyanate groups in an asymetric diisocyanate. The following examples illustrate a multi-stage alternating polyurethane synthesis which utilizes this difference in reactivity.

Polyurethane PU-5 with Alternating Acid Segment and Hard Segment—Multi-Stage Method To a dry 2 L reactor equipped with an agitator under nitrogen atmosphere were charged acid-diol AD-2 (150.04 g) and sulfolane solvent (77.5 g). The reactor was cooled to about 15° C. with adequate mixing. To the reactor was added 2,4-TDI (26.11 g) at such a rate that the temperature could be controlled between 15 and 20° C. When the content of NCO reached 2.33%, a hard segment diol HSD-1 (55.02 g) of HSD-1 was added and reaction mixture was thoroughly mixed. The exotherm raised the reaction temperature and this was controlled so as not to exceed 50° C. When the content of NCO reached below 0.14%, BMEA (1.39 g) was added and the resulting reaction mass was held for 60 minutes at 50° C. to ensure that all NCO was consumed. Neutralization and aqueous inversion were accomplished by first adding aqueous KOH (45%, 17.64 g), followed by D.I. Water (675.18 g) to the reaction mass. Mixing was continued at 50° C. for 2 hours to provide PU-5 as an alternating polyurethane dissolved in water. The properties of PU-5 are listed in Table 3.

Polyurethane PU-6 with Alternating Acid Segment and Hard Segment—Multi-Stage Method To a dry 500 mL reactor equipped with an agitator under nitrogen atmosphere were charged acid-diol AD-3 (50.06 g) and sulfolane solvent (77.52 g). The reactor was cooled to about 15° C. with adequate mixing. To the reactor was added 2,4-TDI (21.00 g) at such a rate that the temperature could be controlled between 15 and 20° C. When the content of NCO reached 3.17%, a hard segment diol HSD-1 (43.80 g) of HSD-1 was added and reaction mixture was thoroughly mixed. The exotherm raised the reaction temperature and this was controlled so as not to exceed 50° C. When the content of NCO reached below 0.05%, BMEA (0.1 g) was added and the resulting reaction mass was held for 60 minutes at 50° C. to ensure that all NCO was consumed. Neutralization and aqueous inversion were accomplished by first adding aqueous KOH (45%, 32.82 g), followed by D.I. Water (290.88 g) to the reaction mass. Mixing was continued at 50° C. for 2 hours to provide PU-6 as an alternating polyurethane dissolved in water. The properties of PU-6 are listed in Table 3.

TABLE 3

| Polyurethane | Final Solids (%) | AN | Mn |
|---|---|---|---|
| PU-5 | 19.9% | 47.5 | 10590 |
| PU-6 | 21.5% | 69.4 | 9047 |

Control Aqueous Polyurethane (IPDI/T650/DMPA—Terminated with BMEA)

To a 2 L reactor were charged Terathane® 650 (293.53 g, OH #172.3, Invista Chemical) and tetraglyme (181.95 g) solvent. To the stirred solution at room temperature was added isophorone diisocyanate (224.19 g) over 60 minutes while allowing the temperature to rise during the addition. To the mixture was then added dimethylol propionic acid (61.91 g) followed by rinsing with tetraglyme solvent (9.58 g). The reaction mixture was heated to 80° C., and dibutyl tin dilaurate (0.04 g) was added when the solution became clear. When the NCO content reached below 1.5%, bis(2-methoxy ethyl)amine (24.50 g) was added over 30 minutes, followed by rinsing with tetraglyme solvent (9.58 g). The reaction was held at 80° C. for 1 hr. The polyurethane solution thus obtained was inverted under high speed mixing by adding a mixture of KOH (25.87 g) in water (1683.55 g) to provide the control aqueous polyurethane solution with a measured solids of 24.9% and an AN of 53.

Preparation of Ink and Testing of Durability

The inks were prepared by conventional processes known to one skilled in the art using a carbon black Self-Dispersed Pigment (SDP) as colorant and a polyurethane of the present invention (PU-1 through PU-6) as a binder. The inks were processed by routine operations suitable for ink jet ink formulation.

A carbon black SDP prepared by E.I. DuPont and all ingredients listed in Table 4 below, except the polyurethane binder, were first mixed together. After these ingredients have been mixed, the polyurethane binder was added followed by stirring to form the final inks. A control ink absent of any polyurethane binder was also prepared. The inks were printed on various paper media, and the prints were assessed for Optical Density (OD), highlighter fastness with one (1×) swipe and two (2×) swipes of the pen, and smudge durability after 10 seconds.

TABLE 4

| Vehicle Ingredient | Weight % in Ink |
|---|---|
| Butyl Cellosolve | 10.0 |
| Butyl Carbitol | 16.0 |
| 2-Pyrrolidone | 5.0 |
| Polyurethane binder | 2.0 |
| Sulfolane | 3.0 |
| DuPont SDP black | 3.0 |
| De-ionized Water | Balance to 100% |

As shown in Table 5 below, the OD, highlighter fastness and smudge durability of prints depend both on the ink and the paper media. Overall, the presence of the inventive polyurethane binders (PU-1 through PU-6) improved the OD, highlighter fastness and smudge durability.

TABLE 5

| Paper | Binder | OD | 1 h Highlighter Smear# (1X) | 1 h Highlighter Smear# (2X) | Smudge* |
|---|---|---|---|---|---|
| Hammermill | PU-1 | 1.27 | 2.0 | 1.0 | 4.0 |
| Hammermill | PU-2 | 1.24 | 2.0 | 1.0 | 4.5 |
| Hammermill | PU-3 | 1.28 | 2.0 | 1.0 | 2.0 |
| Hammermill | PU-4 | 1.26 | 3.0 | 1.0 | 4.5 |
| Hammermill | PU-5 | 1.05 | 4.0 | 2.5 | 4.0 |
| Hammermill | PU-6 | 0.97 | 4.5 | 3.0 | 4.0 |
| Hammermill | Control | 1.17 | 3.5 | 2.0 | 2.0 |
| Xerox 4200 | PU-1 | 1.00 | 3.0 | 2.0 | 2.5 |
| Xerox 4200 | PU-2 | 1.23 | 4.0 | 2.0 | 3.0 |
| Xerox 4200 | PU-3 | 1.19 | 3.0 | 2.0 | 2.0 |
| Xerox 4200 | PU-4 | 1.18 | 3.0 | 2.0 | 3.0 |
| Xerox 4200 | PU-5 | 1.21 | 2.0 | 2.0 | 3.0 |
| Xerox 4200 | PU-6 | 1.15 | 2.5 | 2.5 | 3.5 |
| Xerox 4200 | Control | 1.14 | 3.5 | 3.0 | 2.5 |
| HP Multipurpose | PU-1 | 1.37 | 1.5 | 0.00 | 2.5 |
| HP Multipurpose | PU-2 | 1.33 | 2.0 | 1.0 | 3.0 |
| HP Multipurpose | PU-3 | 1.36 | 1.5 | 1.0 | 1.5 |
| HP Multipurpose | PU-4 | 1.35 | 2.5 | 1.0 | 3.0 |
| HP Multipurpose | PU-5 | 1.29 | 4.0 | 1.0 | 4.0 |
| HP Multipurpose | PU-6 | 1.25 | 3.0 | 1.5 | 3.5 |
| HP Multipurpose | Control | 1.28 | 3.0 | 1.5 | 2.5 |

*Visual Rating for Smudge
0—Ink largely removed
2—Severe smudge
3—Moderate smudge
4—Very slight smudge
5—No smudge visible
Visual Rating for Highlighter Smear
0—Ink largely removed from stripe with highlighter
1—Severe smear, considerable color transfer, may be some damage to stripe
2—Noticeable smear, run full width of area between stripes
3—Moderate smear, may be full width of highlighter, but light in color
4—Slight smear, narrow, doesn't run clear to next stripe
5—No smear visible Latency Test Latency (decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted During each scan across the page, the pen prints a pattern of 9 vertical lines spaced about 1/16 inch apart. Each vertical line is formed by all nozzles firing one drop, therefore the line is one drop wide and about 1/2 inch high corresponding to the length of the nozzle array on the printhead. The first vertical line in each scan is the first drop fired from each nozzle after the prescribed latency period, the fifth line was the fifth drop from each nozzle on that scan, and so forth for all 9 lines.

The pattern was repeated at increasingly longer time intervals (decap times) between scans. The standard time intervals between scans was 0, 2, 4, 6, 8, 10, 15, 20 and 30 seconds.

Upon completion of the test, the $1^{st}$ vertical lines in each scan was examined for consistency, misdirected drop deposits, and clarity of the print. These lines correspond to the $1^{st}$ drops of ink droplets ejected from the nozzle after a prescribed latency period. The decap time was the longest time interval where the particular vertical line can be printed without significant defects.

Preferably, the pen will fire properly on the first drop. However, when the first drop fails to eject properly, the decap time for the second to the ninth drops can provide some information as to the severity of the pluggage and how easily the nozzles can be recovered.

The inks formulated above including PU-1 through PU-6 as binder and an ink containing the Control Polyurethane Dispersant were tested and results are shown in Table 6. Only the first drop decap time at latent intervals of 0, 2, 4, 6, 8, 10, 15, 20 and 30 seconds was reported. A rating of 5 to 1 was given to each line to designate the print performance for the first drop in each line. As shown in Table 6, the inventive polyurethane dispersants PU-1 through PU-6 provided superior decap property to inks when compared to a control ink without the presence of the inventive polyurethane.

TABLE 6

| Polyurethane | $1^{st}$ Drop Latent Interval (seconds)/Line 1 Rating§ | | | | | | | | |
|---|---|---|---|---|---|---|---|---|---|
| | 0 | 2 | 4 | 6 | 8 | 10 | 15 | 20 | 25 | 30 |
| PU-1 | 5 | 3 | 3 | 2 | 2 | 2 | 2 | 2 | 2 | 2 |
| Pu-2 | 5 | 3 | 3 | 2 | 2 | 2 | 2 | 2 | 2 | 2 |
| PU-3 | 5 | 3 | 3 | 2 | 2 | 2 | 2 | 2 | 2 | 2 |
| PU-4 | 5 | 5 | 3 | 3 | 3 | 3 | 2 | 2 | 2 | 2 |
| PU-5 | 5 | 3 | 3 | 2 | 2 | 2 | 2 | 2 | 2 | 2 |
| PU-6 | 5 | 3 | 3 | 3 | 3 | 2 | 2 | 2 | 2 | 2 |
| PU-Control | 5 | 3 | 2 | 2 | 1 | 1 | 1 | 1 | 1 | 1 |

§Visual rating for latency test
5—Lines look good
3—Lines start showing change; lower OD, some misdirects
2—Lines badly misdirected, faint
1—Line absent

What is claimed is:

1. An aqueous ink-jet ink comprising a pigment, an aqueous vehicle and an alternating polyurethane binder comprising a first monomer with a formula of OCN—$R^1$—NCO and a second monomer with a formula of HO—$R^2$—OH, wherein the isocyanate groups in the first monomer react with the hydroxyl groups in the second monomer during polymerization to produce a polymer of the general structure of Formula I:

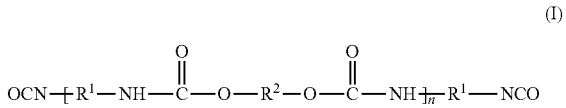

(I)

wherein the terminal isocyanate groups in said polymer is capped with a capping agent;
each $R^1$ is $C_9$-$C_{40}$ arylene substituted by hydroxy, acid or ether, or a polymeric unit of the structure of Formula II:

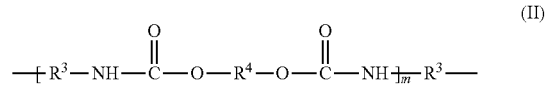

(II)

each $R^2$ is $C_1$-$C_{20}$ alkylene, $C_3$-$C_{20}$ alkylene substituted by hydroxy, acid or ether, $C_6$-$C_{40}$ arylene, $C_9$-$C_{40}$ arylene substituted by hydroxy, acid or ether, polyether, polyester, polycarbonate, polycarbonate-co-polyester, acrylic, or HO—$R^2$—OH is the reaction product of OCN—$R^1$—NCO or a di-anhydride with a diol HO—$R^5$—OH;

each $R^3$ is $C_1$-$C_{20}$ alkylene, $C_3$-$C_{20}$ alkylene substituted by hydroxy, acid or ether, $C_6$-$C_{40}$ arylene, $C_9$-$C_{40}$ arylene substituted by hydroxy, acid or ether;

each $R^4$ is $C_1$-$C_{20}$ alkylene or $C_3$-$C_{20}$ alkylene substituted by hydroxy, acid or ether;

$R^5$ is $C_1$-$C_{20}$ alkylene, $C_3$-$C_{20}$ alkylene substituted by hydroxy, acid or ether, $C_6$-$C_{40}$ arylene, $C_9$-$C_{40}$ arylene substituted by hydroxy, acid or ether, polyether, polyester or polycarbonate;

n is an integer from 1 to 200;

each m is an integer from 1 to 10;

said capping agent is one or more members selected from the group consisting of $R^6CHR^7OH$, $R^6CHR^7SH$, and epoxide $CH_2OCR^7R^8$;

each $R^6$ is $C_1$-$C_{20}$ alkyl, $C_3$-$C_{20}$ alkyl substituted by hydroxy, acid or ether, $C_6$-$C_{40}$ aryl or $C_9$-$C_{40}$ aryl substituted by hydroxy, acid or ether;

each $R^7$ is H, $C_1$-$C_{20}$ alkyl, $C_3$-$C_{20}$ alkyl substituted by hydroxy, acid or ether, $C_6$-$C_{40}$ aryl or $C_9$-$C_{40}$ aryl substituted by hydroxy, acid or ether;

each $R^8$ is H, $C_1$-$C_{20}$ alkyl, $C_3$-$C_{20}$ alkyl substituted by hydroxy, acid or ether, $C_6$-$C_{40}$ aryl or $C_9$-$C_{40}$ aryl substituted by hydroxy, acid or ether, provided that when $R^7$ is H, $R^8$ is not H; and wherein all the ranges of carbon contents for substituents are carbon contents of the substituents of the entire molecules including the substituents, provided that when $R^1$ is Formula II, HO—$R^2$—OH is the reaction product of a di-anhydride with a diol HO—$R^5$—OH.

2. The ink of claim 1, wherein $R^2$ is $C_1$-$C_{20}$ alkylene, $C_3$-$C_{20}$ alkylene substituted by hydroxy, acid or ether, polyether, polyester or polycarbonate.

3. The ink of claim 2, wherein $R^3$ is $C_3$-$C_{20}$ alkylene substituted by hydroxy, acid or ether.

4. The ink of claim 3, wherein n is an integer from 1 to 40.

5. The ink of claim 4, wherein said capping agent is $R^6CHR^7OH$.

6. The ink of claim 1, wherein $R^1$ is a polymeric unit of the structure of Formula II:

$$\underset{(II)}{-\!\!\left[\!R^3\!-\!NH\!-\!\overset{O}{\overset{\|}{C}}\!-\!O\!-\!R^4\!-\!O\!-\!\overset{O}{\overset{\|}{C}}\!-\!NH\!\right]_{\!m}\!\!\!-\!R^3\!-\!.}$$

7. The ink of claim 6, wherein said di-anhydride is 3,3',4,4'-biphenyl-tetracarboxylic acid dianhydride, pyromellitic dianhydride or 4,4'-oxydiphthalic dianhydride.

8. The ink of claim 7, wherein $R^5$ is polyether or polycarbonate, and m is an integer from 1 to 6.

9. The ink of claim 1, wherein HO—$R^2$—OH is the reaction product of a di-anhydride with a diol HO—$R^5$—OH.

10. The ink of claim 9, wherein said di-anhydride is biphenyl-tetracarboxylic acid dianhydride, pyromellitic dianhydride or oxyphenyl dianhydride.

11. The ink of claim 10, wherein $R^5$ is polyether or polycarbonate, and m is an integer from 1 to 6.

* * * * *